US011366910B2

(12) United States Patent
Talmor et al.

(10) Patent No.: US 11,366,910 B2
(45) Date of Patent: Jun. 21, 2022

(54) METHOD AND SYSTEM FOR SECURE APPLICATIONS USING BLOCKCHAIN

(71) Applicants: Eli Talmor, Haifa (IL); Rita Talmor, Haifa (IL)

(72) Inventors: Eli Talmor, Haifa (IL); Rita Talmor, Haifa (IL)

(*) Notice: Subject to any disclaimer, the term of this patent is extended or adjusted under 35 U.S.C. 154(b) by 134 days.

(21) Appl. No.: 16/233,217

(22) Filed: Dec. 27, 2018

(65) Prior Publication Data
US 2020/0210594 A1 Jul. 2, 2020

(51) Int. Cl.
| | |
|---|---|
| *G06F 21/60* | (2013.01) |
| *H04L 9/08* | (2006.01) |
| *H04L 9/40* | (2022.01) |
| *G06Q 20/38* | (2012.01) |
| *G06Q 20/36* | (2012.01) |

(52) U.S. Cl.
CPC .......... *G06F 21/602* (2013.01); *G06Q 20/36* (2013.01); *G06Q 20/389* (2013.01); *G06Q 20/3829* (2013.01); *H04L 9/0861* (2013.01); *H04L 63/08* (2013.01); *G06Q 2220/00* (2013.01); *H04L 2209/38* (2013.01); *H04L 2209/56* (2013.01); *H04L 2463/082* (2013.01)

(58) Field of Classification Search
CPC ....... G06F 21/602; G06F 21/64; G06Q 20/36; G06Q 20/3829; G06Q 20/389; G06Q 2220/00; G06Q 20/02; G06Q 20/065; G06Q 20/223; G06Q 20/3678; G06Q 20/3827; H04L 9/0861; H04L 63/08; H04L 2209/38; H04L 2209/56; H04L 2463/082; H04L 63/0442; H04L 2209/805; H04L 2209/88; H04L 9/3239
USPC .......................................................... 713/164
See application file for complete search history.

(56) References Cited

U.S. PATENT DOCUMENTS

| | | | |
|---|---|---|---|
| 6,601,170 B1 * | 7/2003 | Wallace, Jr. | H04L 63/0428 713/165 |
| 10,425,399 B2 * | 9/2019 | Kravitz | H04L 9/0841 |
| 10,601,585 B1 * | 3/2020 | Robinson | H04L 9/085 |

(Continued)

*Primary Examiner* — Sheree N Brown

(57) ABSTRACT

Electronic network include multiple users. Each user operates Wallet software application on his/her endpoint devices (special purpose, computer or smartphone). Each Wallet integrates with Cloud-based Identification-as-a-Service(s) (IDaaS) In context of present invention—IDaaS provides real-time, multi-factor, malware-resilient, context-sensitive Strong Identification-as-a-Service of the user and enables Cryptographic Keys Management of the Wallet. Each Wallet provides various Cryptographic functionalities. Each Wallet may be connected with multiple centralized Marketplace software applications, thus allowing these Cryptographic functionalities to interact with specific Marketplace software application. Each Wallet may be connected with multiple decentralized peer-to-peer software applications, thus allowing these Cryptographic functionalities to interact with specific peer-to-peer software application. These software applications may include Information Technology, Financial, Manufacturing, Retail, Insurance, Government, Healthcare and other verticals of Global Economy. The present invention prevents "Bad Actors" from using or attacking these applications. The present invention also enables Identification of participants of transactions recorded on Blockchain.

20 Claims, 17 Drawing Sheets

(56) References Cited

U.S. PATENT DOCUMENTS

| | | | |
|---|---|---|---|
| 10,797,860 B1* | 10/2020 | Dennis | H04L 63/205 |
| 11,212,665 B2* | 12/2021 | Inoue | G06F 21/64 |
| 2016/0125416 A1* | 5/2016 | Spencer | G06F 21/73 |
| | | | 705/71 |
| 2017/0109735 A1* | 4/2017 | Sheng | H04L 9/3297 |
| 2018/0019993 A1* | 1/2018 | Kravitz | H04L 9/0836 |
| 2019/0289454 A1* | 9/2019 | Inoue | H04L 9/0643 |

* cited by examiner

Wallet Functions:
Any Marketplace
Seller: Offer New Contract (ID)
Buyer: Accept Offered Contract (ID)
Seller: Execute Accepted Contract (ID)
Seller Contract Execution Confirm
(automatic)
Identity Verify (ID)
Identity Append (ID)
Vote Online (ID)

Fig. 17

METHOD AND SYSTEM FOR SECURE APPLICATIONS USING BLOCKCHAIN

CROSS-REFERENCE TO RELATED APPLICATIONS

The following invention claims the benefits of provisional U.S. patent application 62/613,422.

FIELD OF INVENTION

The present invention is in the field of Information Technology (IT) Security. More specifically it refers to users, using their digital wallets to perform mission-critical transactions with other users on any software application that uses Blockchain to store its records.

BACKGROUND OF THE INVENTION

Blockchain technology is simple to understand at its roots. Basically, the tech exists as a shared database filled with entries that must be confirmed and encrypted. It's helpful to envision it as a strongly encrypted and verified shared Google Document, in which each entry in the sheet depends on a logical relationship to all its predecessors. Blockchain provides a way to securely and efficiently create a tamper-proof log of sensitive activity.

A Blockchain is a distributed ledger technology that preserves a continuous chain of records called blocks. Each block is time stamped and linked to previous blocks, using cryptography to verify all records. Thus Blockchain represents secure-by-design ledger. Unlike traditional approaches, Blockchain eliminates the need for centralized control—instead all transactions are decentralized, and verified by the Blockchain database itself in the distributed ledger. Contrary to the most popular use case-cryptocurrency—Blockchain technologies don't only secure financial transactions—in fact they can be used to track and verify any kind of digital asset, as well as code or smart contracts. Blockchain use cases also include the sharing of medical records, processing IoT transactions, and record keeping for the public sector.

There are two kinds of Blockchain: Public with anonymous (more precisely—pseudonymous) records and Private "permissioned" Blockchains—where the identity of all members is known. Cryptocurrency such as Bitcoin uses Public Blockchain, preserving user's Privacy, while Enterprises use Private Blockchain, preserving user's Identity.

"Permissioned" private Blockchains use PKI (Public Key Infrastructure) digital certificates to enable user's Identity into the Blockchain. It is well known that this approach cannot be scaled up to Public Internet. Secure digital certificate provisioning can be performed only within Enterprises.

Today an online marketplace (or online e-commerce marketplace) is a type of e-commerce site where product or service information is provided by multiple third parties, whereas transactions are processed by the marketplace operator. Such marketplace is essentially centralized, combining trading, legal and escrow functionalities. But in the future online marketplace may be become decentralized, using so-called smart-contracts, where these functionalities are programmatically enforced. A smart contract is a computer protocol intended to digitally facilitate, verify, or enforce the negotiation or performance of a contract The need exists to combine Privacy preserving features of Public Blockchain with Identity preserving features of Private Blockchain in order to enable secure Applications using Blockchain.

How Crypto Currency Exchange works today: For example: Seller of BTC (Bitcoin) deposits BTC with the exchange's address. He can then use his positive BTC balance in the exchange to sell his BTC for Dollars (or other coins). Similarly, a buyer of BTC deposits USD with the exchange and then uses the balance to buy BTC from sellers.

Deficiencies of Current state-of-the-art:
Crypto Currency exchanges are based upon anonymous, peer-to-peer transactions. There is no Trusted Third Party to complain: your loss is your loss,
Regulators are scared by Crypto Currency anonymity (playground for Bad Actors). They would rather prefer to prevent from Bad Actors to use it,
Crypto Currency is essentially an Online entity. Its offline usage is extremely limited,
The security of Crypto Currency boils out to the problem of securing a Private Key, i.e. a long String of Alphanumeric Characters. The long history of Internet Security can be summarized as "There is No Way to do it Reliably",
An Online usage of Crypto Currency is done with Personal Wallets. Although Wallets can interact via peer-to-peer, they do trade via centralized Exchanges,
Both Personal Wallets and Exchange Wallets are vulnerable to Private Key attack.
Therefore we need to address all the issues above by:
Removing a Personal Wallet Private Key Vulnerability,
Enabling Secure Crypto Currency Exchange,
Improving Scalability,
Enabling future Regulation,
Keeping Blockchain architecture intact.

Trade finance signifies financing for trade, and it concerns both domestic and international trade transactions. A trade transaction requires a seller of goods and services as well as a buyer. Various intermediaries such as banks and financial institutions can facilitate these transactions by financing the trade. While a seller (or exporter) can require the purchaser (an importer) to prepay for goods shipped, the purchaser (importer) may wish to reduce risk by requiring the seller to document the goods that have been shipped. Banks may assist by providing various forms of support. Prior to Blockchain—B2B scenarios for Global Economy were using Electronic Networks. But electronic networks that involve multiple stakeholders, that are required to reconcile their records, are often inefficient, expensive and vulnerable.

One of the main developments is the introduction of Blockchain technology into the trade finance ecosystem. The promise of Blockchain is that it has the ability to streamline the trade finance process. In the past, trade finance has been provided primarily by financial institutions, unchanged for years, with many manual processes on old-legacy systems that are expensive and costly to update. Blockchain offers are huge advantage as being Secure, Discoverable Ledger. The records in this ledger are anonymous (or pseudonymous), so that only the parties involved know the content of these records. But in many cases, law requires accountability (for example to prevent money laundering) and some cases even preventing such transactions (for example to comply with international sanctions). Thus Identity of the Parties must be known prior to executing these transactions.

Public-key cryptography in theory offers all of the advantages of credentialed pseudonymity. The truth is that identity is an issue the industry has long been struggling with, and not just with people. Our system connects an unfathomable number of entities, individuals, assets, and instruments together, and is composed of a complex web of internal systems, vendor systems, market wide systems, and so on. As a result, it is awash in identifiers.

While we are able to deal with these today, it is an enormous challenge, and a costly one. To bake identity into the Blockchain ledger and make it part of the new market fabric, we will need to tackle this problem at its root, through standardization. That would allow us not only to provide the credentialing for individuals that could be so beneficial, but also for all the parts of the system that will still need to talk to each other. If successful, such standardization of identifiers could drive massive efficiencies.

Online Internet Voting has a very attractive value proposition. Blockchain is a very advantageous for Internet Voting, because it prevents from Bad Actors to influence the Vote and tinker with the Vote results.

Today too many core processes are centralized. As the number of inter-connected and cloud-based IT solutions grows, such an approach will be less effective and efficient. The need exists for a more robust, dynamic but less centralized approach to IAM that grants IT users better control of their digital identities, to manage the access rights of employees in a more flexible and decentralized manner to allow them to work effectively while ensuring the integrity and security of Enterprise systems.

BRIEF DESCRIPTION OF THE DRAWINGS

Various exemplary embodiments are illustrated by way of example, and not by way of limitation, in the figures of the accompanying drawings in which like reference numerals refer to similar elements and in which we describe:

FIG. 17 Wallet functionalities.

BRIEF SUMMARY OF INVENTION

Aforementioned use cases demonstrate the need for Secure Applications using Blockchain. The present invention can be summarized as following:

Electronic network include multiple users. Each user operates Wallet software application on his/her endpoint devices (special purpose, computer or smartphone). Each Wallet integrates with Cloud-based Identification-as-a-Service(s) (IDaaS)—as described in greater details by U.S. patent application Ser. Nos. 15/774,012, 14/905,829. In context of present invention—IDaaS provides real-time, multi-factor, malware-resilient, context-sensitive Strong Identification-as-a-Service of the user and enables Cryptographic Keys Management of the Wallet. Each Wallet provides various Cryptographic functionalities. Each Wallet is connected with multiple Marketplace software applications, thus allowing these Cryptographic functionalities to interact with specific Marketplace software application. Each Marketplace application connected either with one or with two Ledgers. These Ledgers are either user-identifiable Blockchain Ledger or anonymous Blockchain Ledger, or both. Marketplace applications include Financial, Manufacturing, Retail, Insurance, Government, Healthcare and other verticals of Global Economy. The present invention prevents "Bad Actors" from using or attacking these applications.

DETAILED DESCRIPTION OF THE INVENTION

Figure 1:
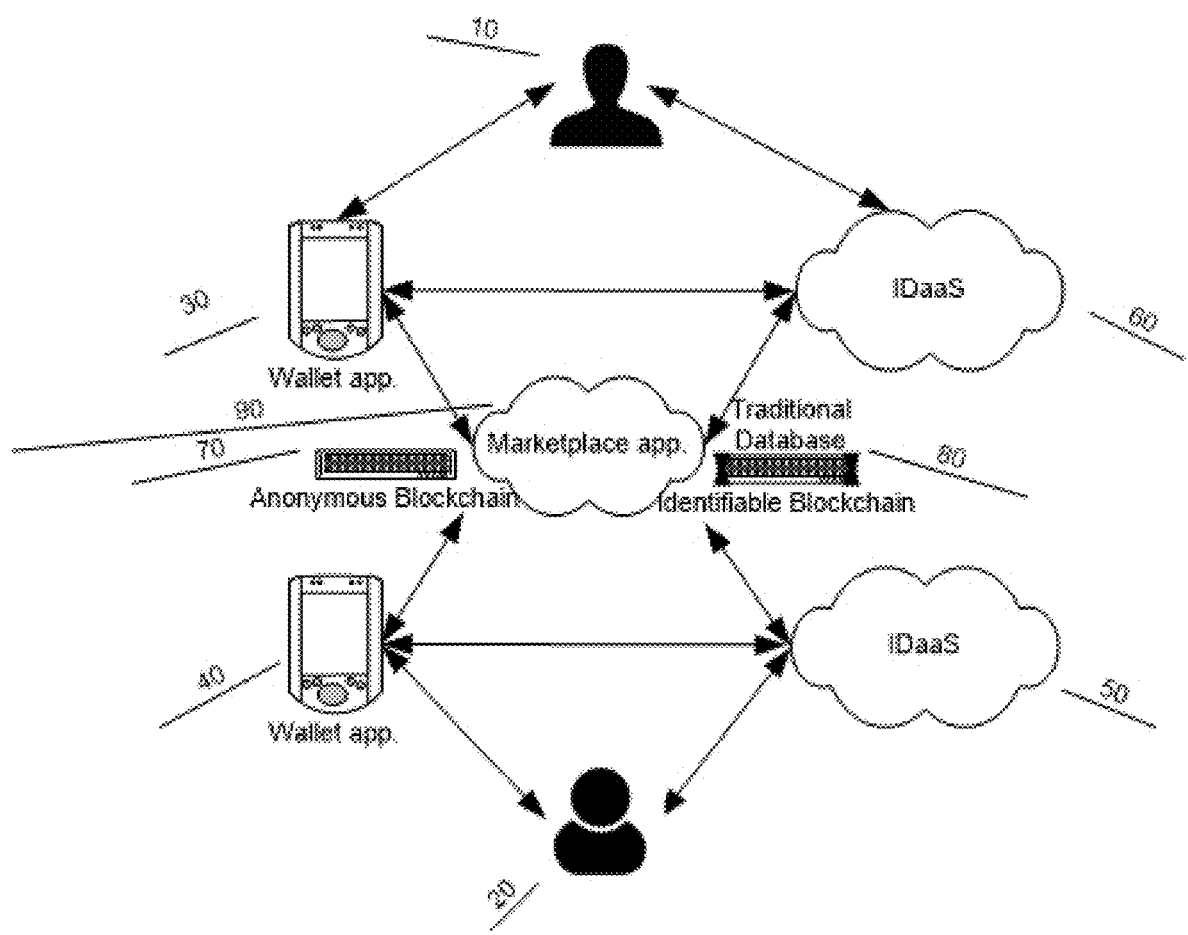
FIG. 1: Invention Summary for Centralized Marketplace.

Referring to FIG. 1—two users 10,20 are using their wallet applications 30,40 and IDaaS 50,60 to interact with Marketplace application 90, incorporating Anonymous and Identifiable Blockchain or Anonymous Blockchain and Traditional Database 70,80 or both.

Figure 2:
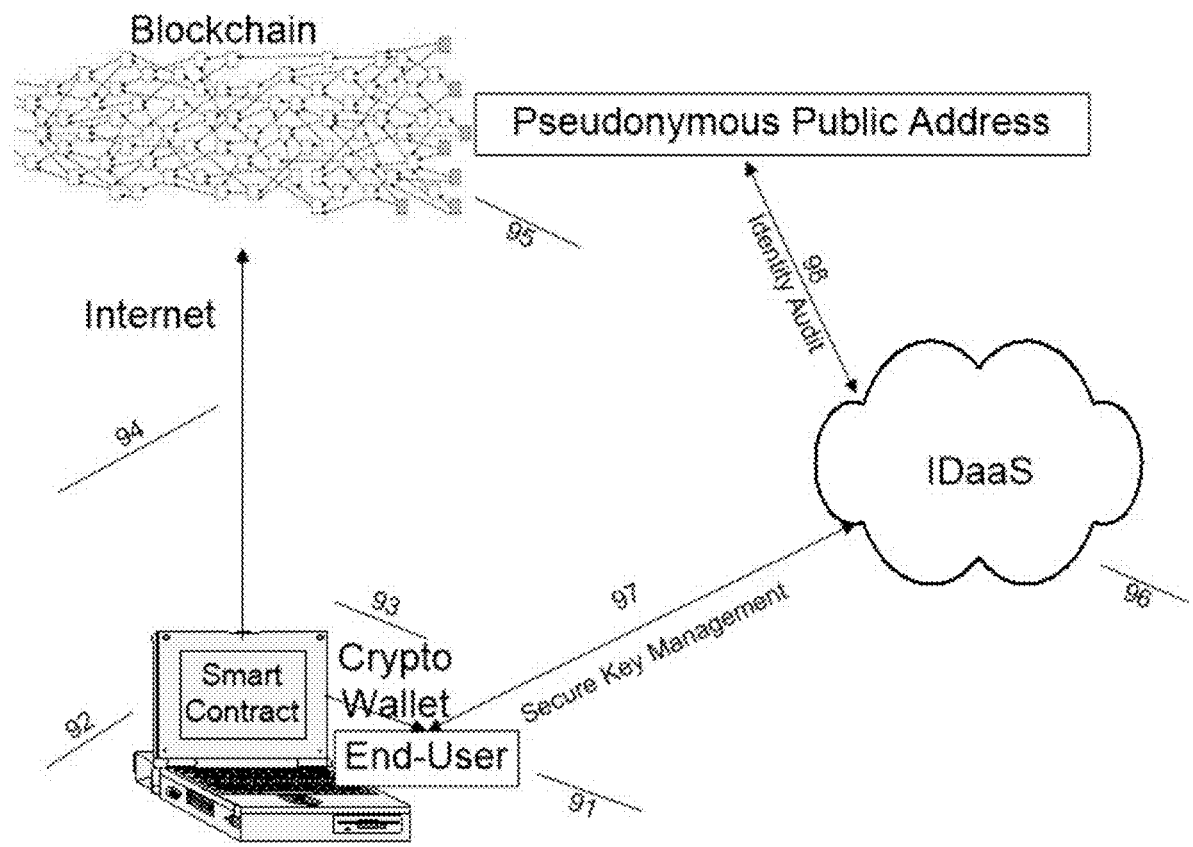
FIG. 2: Invention Summary for Decentralized Application (Dapp) using Smart Contract.

As mentioned previously—centralized marketplace application can be replaced with smart contract. FIG. 2 addresses this as following:

Referring to FIG. 2: User 91, uses his Crypto Wallet 93 and IDaaS 96 to sign a smart contract 92, executed over the Internet 94 and recorded on Blockchain 95. The records on Blockchain contain pseudonymous public address of the users. The audit 98 links public address to Identity using IDaaS. The same IDaaS is used to provide a Secure Key Management 97 for Crypto Wallet 93.

Use Case #1: Cryptocurrency Exchange.

Figure 3:
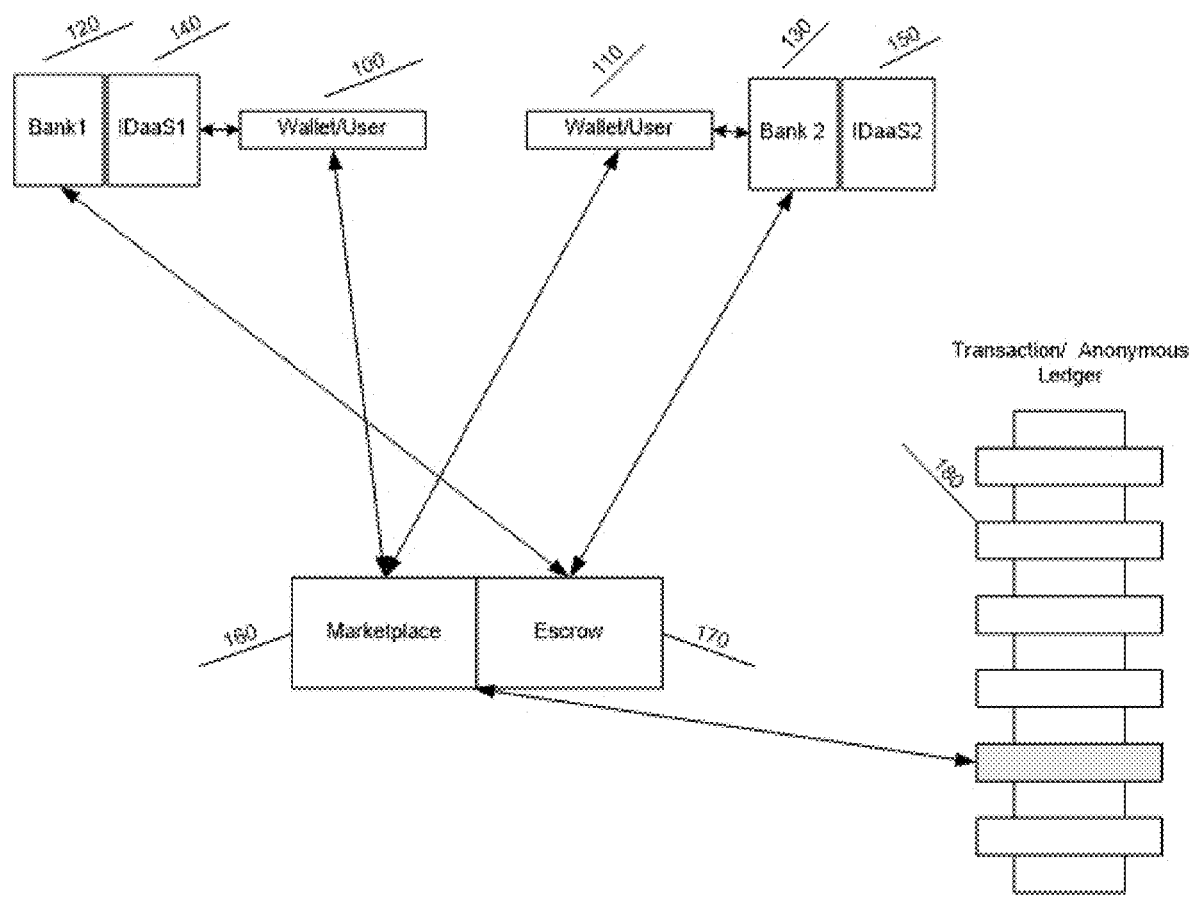
FIG. 3 Crypto Currency exchange—architecture.

This particular embodiment is described in FIG. 3. Referring to FIG. 3 two users are using their Wallets 100,110 linked to their IDaaS 140,150 to sell cryptocurrency via Cryptocurrency Exchange, denoted as Marketplace 160. The same users are using their Banks 120,130 to buy cryptocurrency via Cryptocurrency exchange, denoted as Escrow 170. Banks are responsible for the transaction legitimacy. The transaction is recorded on Blockchain 180.

This embodiment practical implementation consists of Crypto Currency and Fiat Currency Flows. Crypto Currency (for example Bitcoin (BTC)) flow:

Buyer finds Seller (address) offer to sell 1 BTC for $10,000 on the exchange.
Buyer transfers $10,100 to the Marketplace. Exchange posts buyer address to the seller, Seller authorizes (via Identification) the transfer to the seller. Transaction recorded on Blockchain. Exchange transfers $9900 to the Seller. Real Time BTC transfer: Seller (Public Address)—Marketplace—Buyer (Public Address).

Fiat currency (for example $) flow:
Real-Time Fiat Currency Money Transfer: Buyer—Marketplace (commission from both sides)—Seller.

Figure 4:
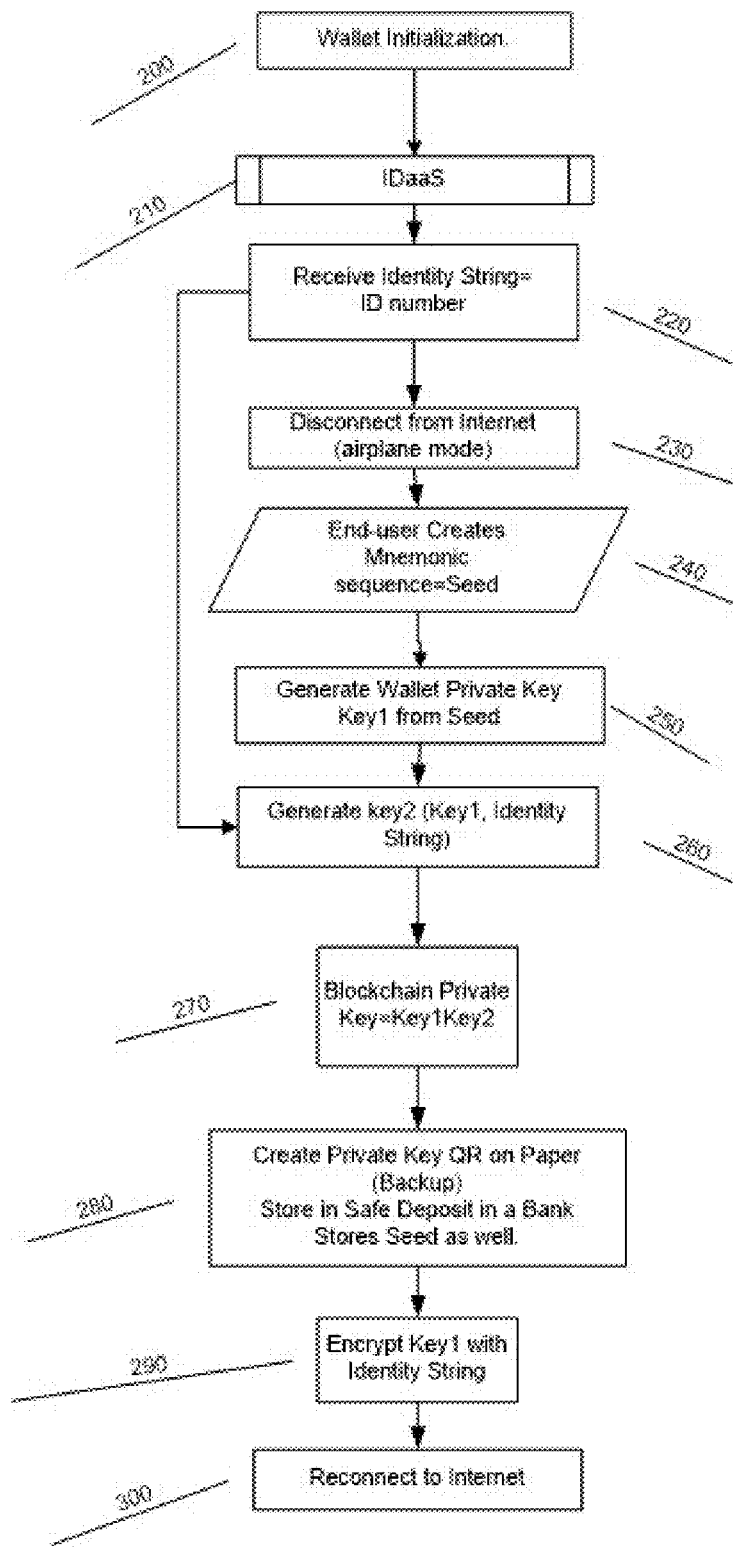
FIG. 4 Wallet for Centralized Marketplace—initialization.

The usage of wallet for cryptocurrency exchange requires the solution of the problem of user's Blockchain Private Key. To this end the usage of wallet includes the following steps, removing a Blockchain Private Key Vulnerability:

Referring to FIG. 4—Wallet initialization 200 includes the following Steps:

Step 1:
Online Identification vs. IDaaS 210 (over SSL). On success Identity String 220 is returned.

Step 2:
Disconnect from the Internet 230 (airplane mode). (Wallet, disconnected from the Internet, is called "cold").
Step 3:
Enter mnemonic sequence (seed phrase) 240.
Step 4:
Generate Wallet Private Key1 using mnemonic sequence 250.
Step 5:
Using key 1 and Identity String generate key2 260.
Key2=Key2 (Key1, Identity String)
So that Blockchain Private Key 270 is given by:
Blockchain Private Key=Private Key (Key1, Key2)
Step 6:
Encrypt Key1 with Identity String.
Step 7:
Print Private Key with QR on paper 280.
Print seed phrase on paper. Store printed backup in Banks vault.
Step 8:
Encrypt 290 Key1 by Identity String
Step 9:
End of initialization. Reconnect to the Internet 300.
The above scheme effectively resolves the problem of Blockchain Private Key security.

The only remaining vulnerability: Blockchain Private Key exists in Memory in split-seconds, while Wallet is online ("hot"). To take care of this vulnerability on Windows wallets—one must limit the memory access rights as following: protect
the PROCESS_VM_READ and PROCESS_QUERY_INFORMATION rights (as described in references on "How to Read and Write Other Process Memory" and "Process Security and Access Rights").

Figure 5:
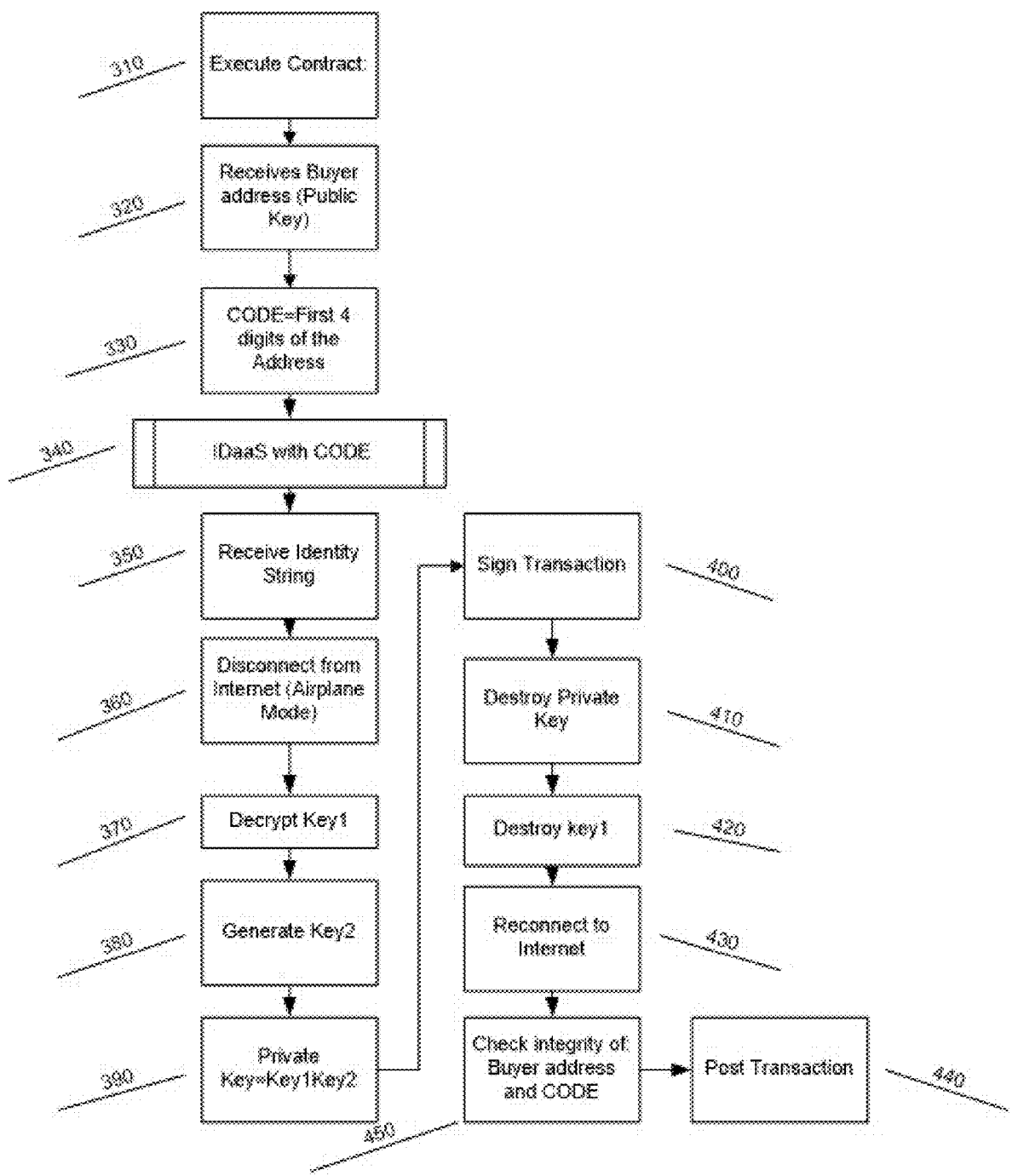
FIG. 5 Wallet for Centralized Marketplace—execution.

Referring to FIG. 5: In order to Execute the Accepted Contract 310 (for example to sell cryptocurrency)—the following steps must be performed using wallet:
Step 1:
Get the recipient Blockchain Pubic address 320. Online Identification (over SSL). Online Identification includes 340 entering 4 digit CODE 330 by the user, displayed in Bold on user's screen. On success Identity String is returned. 350
Step 2:
Disconnect from the Internet (airplane mode) 360.
Step 3:
Decrypt key1 with Identity String 370.
Step 4.
Using key 1 and Identity String generate key2 380.
Resulting in 390:
Blockchain Private Key=Private Key (key1, key2)
Step 5:
Copy/paste the recipient address. Sign Transaction 400. The address of the transaction (public key) must be matched with IDaaS CODE returned by IDaaS 450. Thus validating the recipient public address and preventing malware attack.
Step 6:
Destroy Private Key 410 and key1 420.
Step 7:
Reconnect to Internet 430.
Step 8 Post Transaction 440.

Identity String is a Large Random number known to IDaaS, but unknown to User. Identity String is a shared secret with Wallet app. Wallet Private Key is a Large Random number known to User but unknown to IDaaS. Wallet Private Key and Identity String are used to calculate Blockchain Private and Public Keys as generally known in "Public-key cryptography".

FIGS. 4 and 5 describe the wallet that can be used for Centralized marketplace. For Smart Contracts—an alternative embodiment is advantageous: for example Smart Contract may be utilized using Web integration with wallet, such as Metamask Browser-based Wallet.

Figure 6:
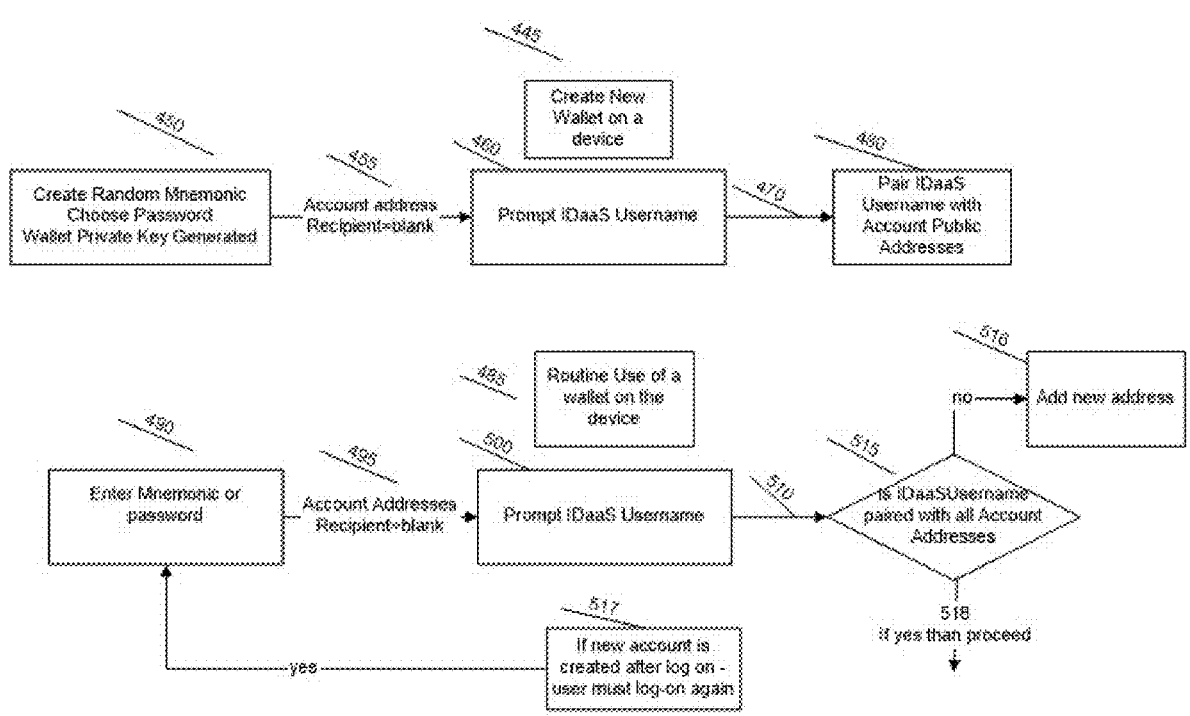
FIG. 6 Wallet for Decentralized Application—initialization.

Referring to FIG. 6: to create a new wallet on a personal Device (dedicated hardware, PC or smartphone) 445:
The user creates a random mnemonic and chooses password. This results in Wallet Private Key generation 450. This in turn results in Public Key and Public Address 455 generation. The Wallet sends 470 the Public Address 455 together with IDaaS Username 460. This results in pairing IDaaS username with Public Address 480. By pairing Public Address with IDaaS username—phishing of password/mnemonic will be futile, since the Public Address is protected by external Identification-as-a-Service (IDaaS).

Subsequent usage of the wallet on the same Device 485 includes:
Entering Mnemonic or password 490. This will results in retrieval of all account addresses (public/private key pairs). The Wallet sends all Public Addresses 495 together with IDaaS Username 500. If 515 IDaaS is already paired with all Public Addresses then wallet will continue its initialization 518. If user has created a new account (public address) then it will be added 516. The user may add new account (public address) after login. In this case she/he must log-in again 517.

It should be noted that seed phrase (mnemonic) is enough to recover all accounts. The seed phrase is sufficient to regenerate all keys. A "hierarchical deterministic wallet" (HD wallet) like MetaMask can generate an unlimited number of "accounts" (public/private key pairs) from a single "seed phrase". With an HD wallet, it's possible to support multiple accounts, and even multiple crypto currencies, and all the user has to record is a single seed phrase.

Figure 7:
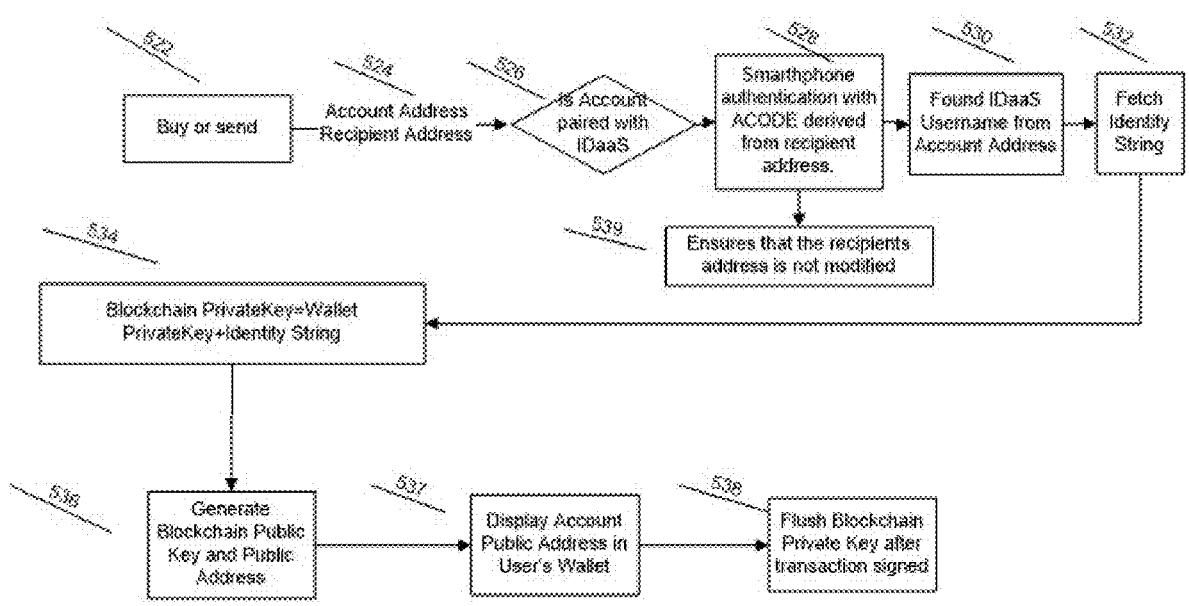
FIG. 7 Wallet for Decentralized Application—execution.

In continuation of FIG. 6, step 518 and Referring to FIG. 7:
The user entering into Buy or Send cryptocurrency 522, needs to enter a recipient address. Then both his account address and recipient address are sent to IDaaS 524. If his account is paired with IDaaS—he performs smartphone multi-factor authentication with ACODE derived from recipient address 528 (as described in greater detail in U.S. patent application Ser. Nos. 15/774,012, 14/905,829). This ensures that transaction-recipient address is not modified by malware 539. IDaaS username is found from Account Address 530 (since they are paired 526) and user's Identity String is returned to the Wallet. Since the Identity String is a random number, its addition to Wallet Private Key is also a random number, to be chosen as Blockchain Private Key of the user 534. Subsequently Blockchain Public Key and Address is calculated 536. This Public Address will become a new Account Address 537. After transaction is signed-Blockchain Private Key is flushed from memory 538.

Use Case #2: Trade Finance.

Figure 8:
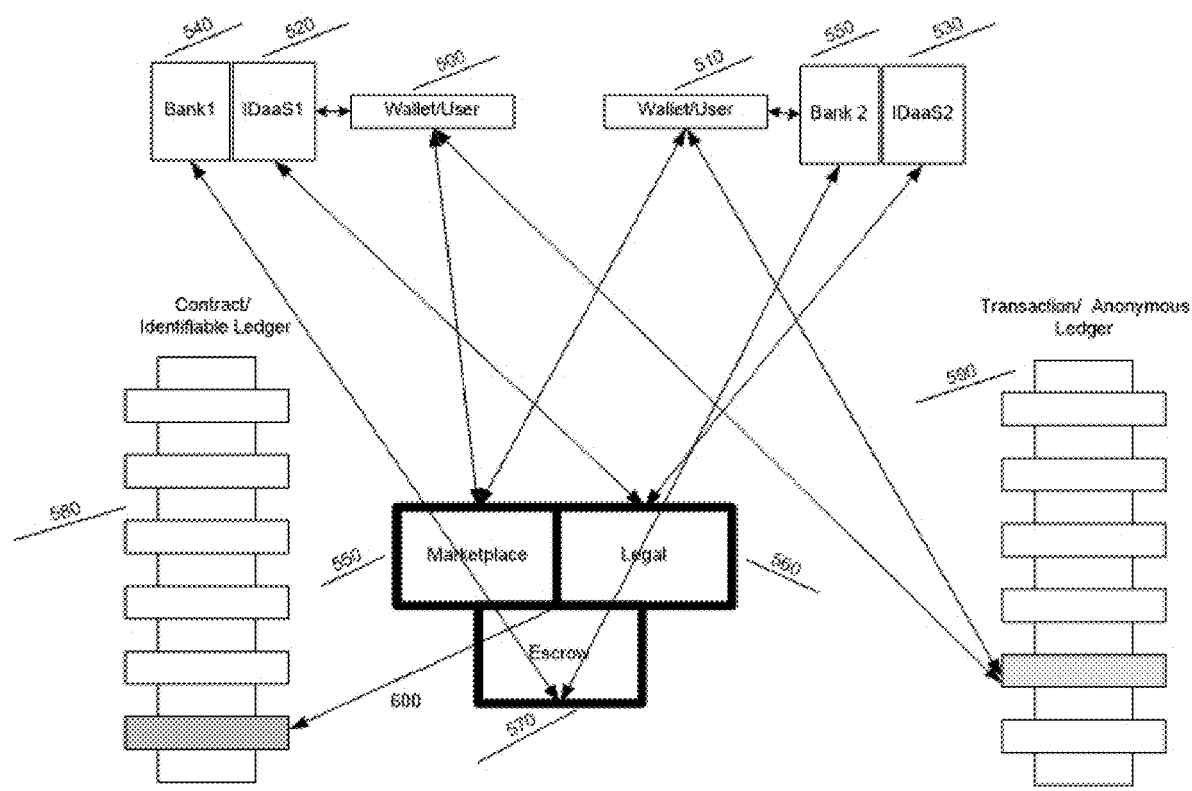
FIG. 8 Trade Financing—architecture.

This particular embodiment is described in FIG. 8. Referring to FIG. 8—the solution for Trade Finance involves single or multiple Identification-as-a-Service(s) (IDaaS) serving various Bank users through their wallets. Each User may interact with Centralized Marketplace 550 software application through their wallet application 500,510. Each IDaaS 520,550 may interact with Legal 560 application and each Bank 540,550 may interact with Escrow 570 application. Marketplace 550 & Legal 560 & Escrow 570 control the access to Contract Ledger 580. The Contract being offered by the Seller (or user who proposed it). The Contract Ledger is identifiable (not anonymous) by design. So that all parties (Seller and Buyer(s) may be identified by Legal app. After record is recorded into Identifiable Contract ledger, it may be executed as transaction in anonymous Transaction ledger 590. This solution may use fiat currency trading through traditional banks.

The Marketplace can be any Activity where users (buyers and sellers) meet and their transaction require recording. Separation of different Activities to different Marketplaces and thus different Blockchains improves their throughput (see more on "What is Blockchain Bloat?"). The presented architecture allows performing any type of activity in secure, cost-effective, legally accountable manner, while preserving the Privacy of various participants.

Trade Financing Contracts may be in any one of the following Stages:
1. Offered by Seller (for example offering to sell the particular House for Specific Amount).
2. Accepted by Buyer (if approved by Marketplace/Legal/Escrow). There may be multiple Buyers (for example each buying an apartment in the House)
3. Executed by Seller (if Seller transferred the ownership of this House to the Buyer.

Figure 9:
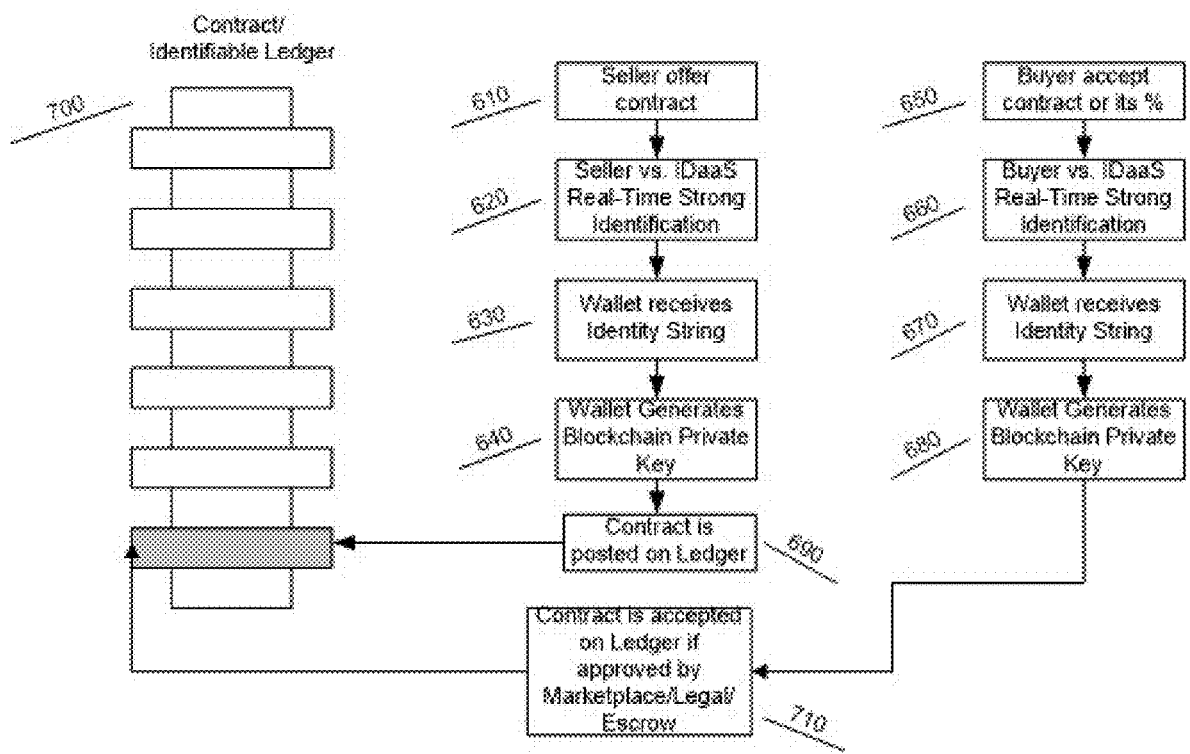
FIG. 9 Trade Financing—Contract ledger.

Contract Ledger of FIG. 8 is used for the storage of the Contracts prior to their execution. The steps, required from Seller and Buyer, to process from Stage 1 to Stage 2 are shown in FIG. 9. The functionalities of Offering Contract by Seller and Accepting Contract by Buyer or Buyers are implemented in user's Wallet application. Identity String is a shared secret with Wallet app., i.e. a Large Random number (known by IDaaS, but unknown to User). It is used to generate asymmetric Private-Public Key Pair (see reference on "Public-key cryptography"). Blockchain Private Key is used to post a contract on ledger. Seller offers a contract 610, his Identity verified 620, resulting in Wallet receiving Identity String 630, thus calculating Blockchain Private Key 640, that is used to sign a contract 690 to be posted on the Blockchain ledger 700. Buyer willing to accept the contract 650, his Identity verified 660, resulting in Identity string received 670, thus calculating Blockchain Private Key 680 and finally Contract acceptance 710 to be recorded on Blockchain Ledger 700.

Alongside with Posting Transaction Record to Transaction ledger—the wallet will automatically confirm to Marketplace that the Contract is executed. There could be multiple Marketplaces for different types of Records, Goods, Properties, Commodities, Investments, Currencies, etc. Each Wallet may facilitate their Buying, Selling and Registry, allowing secure flow of Data.

Figure 10:
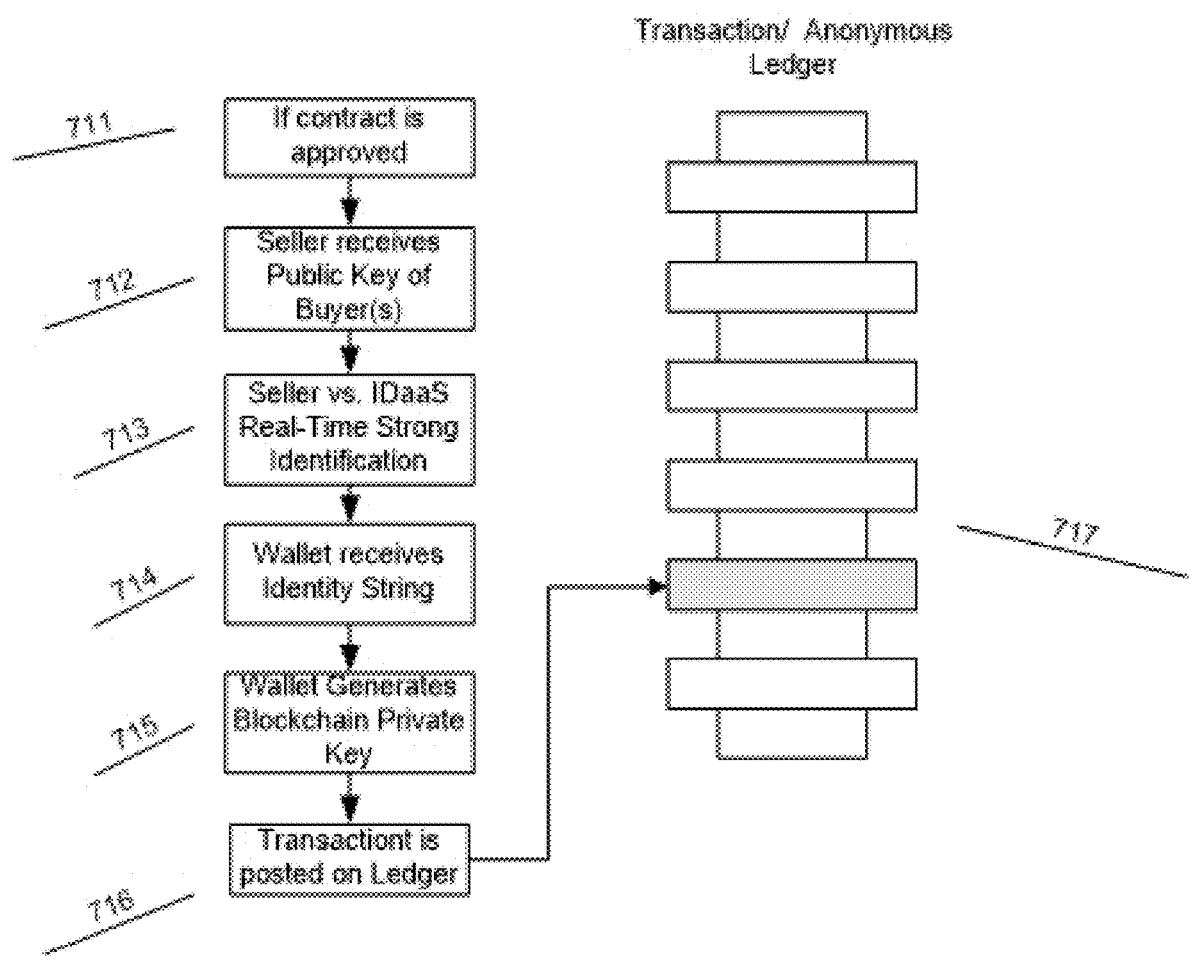
FIG. 10 Trade Financing—Transaction Ledger.

Referring to FIG. 10—the steps, required from Seller to process from Stage 2 to Stage 3, are shown as following: If contract is legally approved 711—the Seller receives Blockchain Public Key of the Buyer(s) 712, seller's Identity is verified 713, resulting in his Wallet receiving Identity string 714 and generating Blockchain Private Key 715, thus signing the transaction with Buyer(s) and 716 and posting it Transaction Blockchain Ledger 717. The latter being anonymous (pseudonymous).

Figure 11:
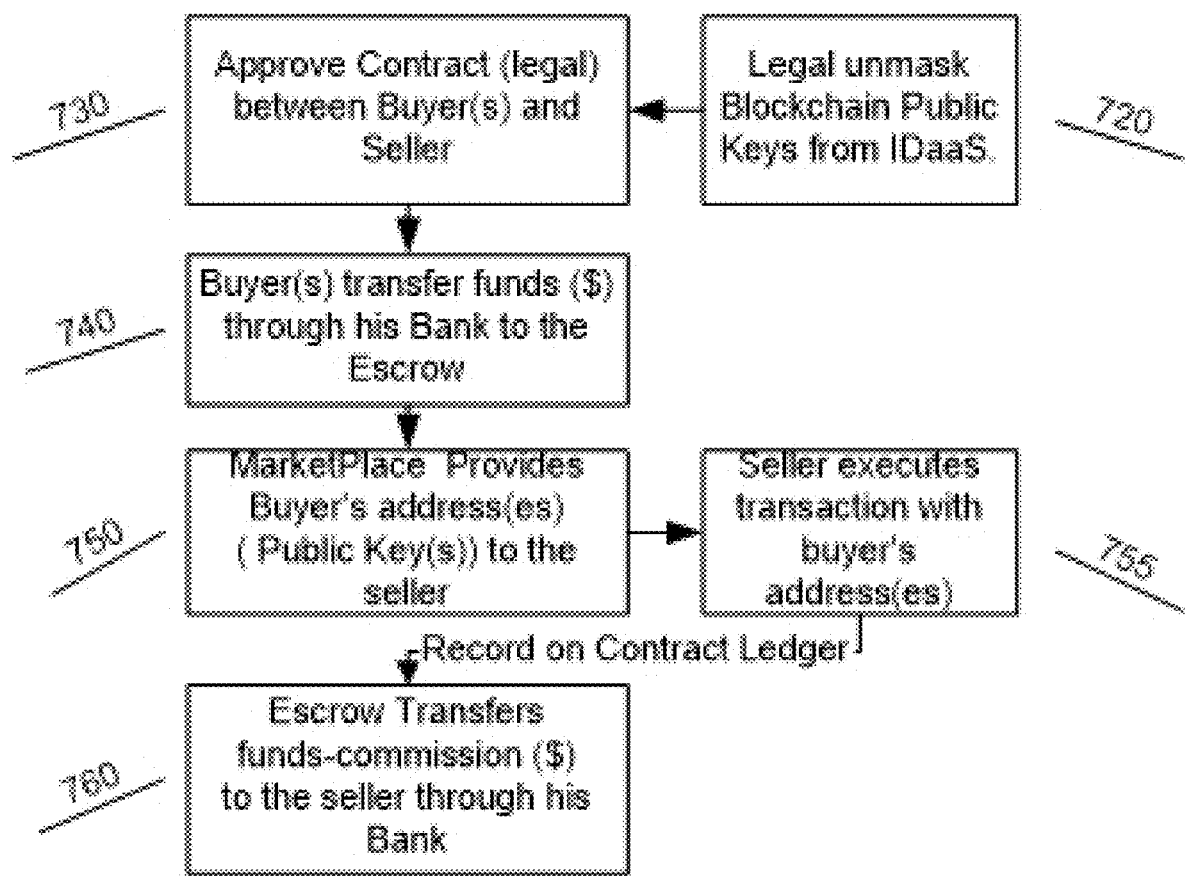
FIG. 11 Trade Financing—Marketplace/Legal/Escrow.

The stages 1 to 2 to 3 of Trade Financing Contracts require Marketplace/Legal/Escrow approval. Referring to FIG. 11: Marketplace, Legal and Escrow applications are fully integrated. Following validating legal identities 720, contracts are approved 730, buyer sends his fiat currency funds through his Bank to Escrow 740. Following that Marketplace provides Buyer's public addresses to the seller 750. The seller executes transaction with buyer(s). Escrow transfer funds to the seller 760.

Alternatively one can use cryptocurrency peer-to-peer trading through Smart Contracts, where legal and escrow functionalities are programmatically enforced. Furthermore Contract/Identifiable ledger 580 of FIG. 8 may be replaced by traditional database where Blockchain public address is linked to real Identities.

Use Case #3: Identity Management.

Often we need to present our Identity, but always we need to preserve our Identity. Bad actors may try to steal it (Identity Theft) or use it fraudulently (Identity Fraud). They may even create completely Fake Identity (Synthetic Identity Theft).

On the other hand, while we present our Identity—we should limit the presentation to bare minimum: to get a drink in the Bar you only need to present your age, but to vote you need present your National Identity Card. To open a Bank Account—you will need to present multiple credentials. Blockchain is ideally suited to store our Identity Attributes, because they cannot be altered without authorization. But storing these attributes in decentralized public Blockchain does not provide a mechanism for preventing Bad Actors getting advantage. We need to prevent from Bad Actors to access this Identity Blockchain altogether.

Figure 12:
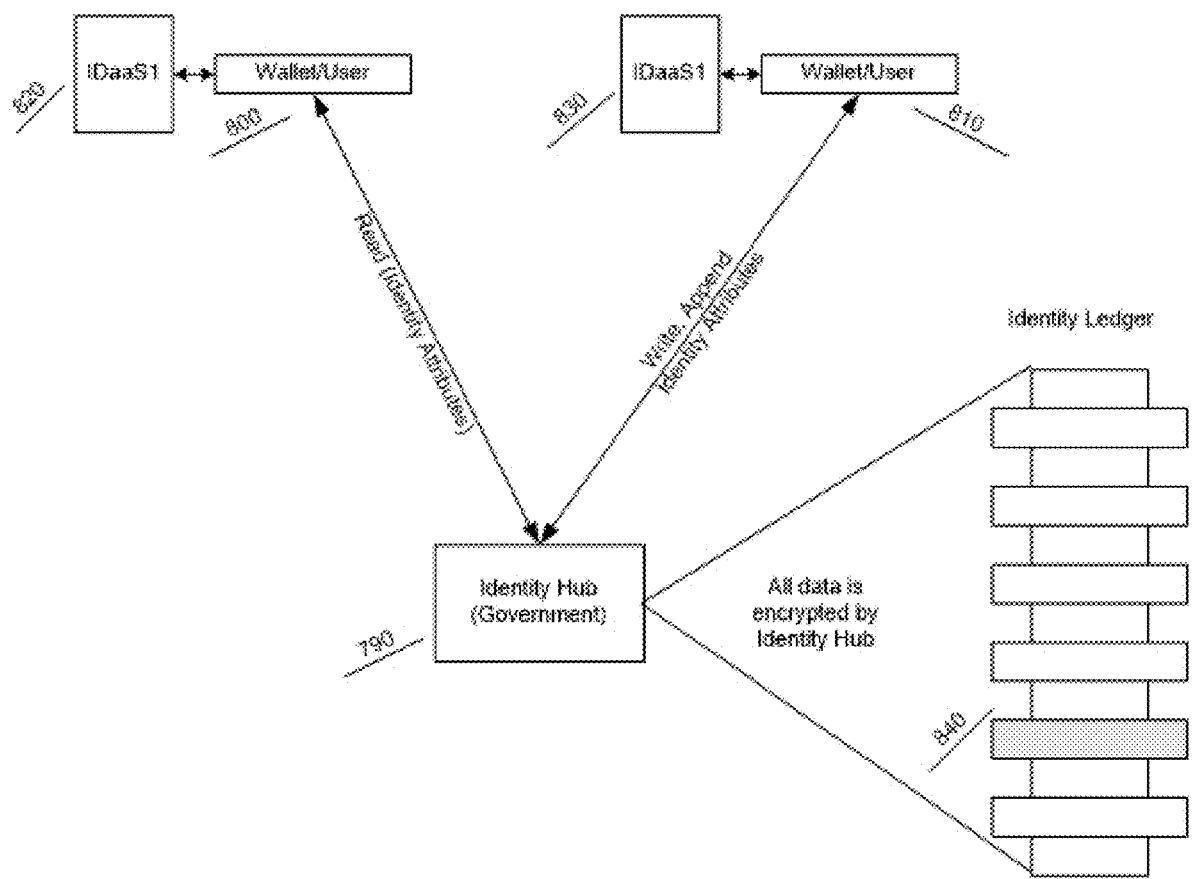
FIG. 12 Identity—Blockchain architecture.

This particular embodiment is described in FIG. 12. Referring to FIG. 12 shows a Marketplace (denoted as Identity Hub, possibly operated by Governmental authority or International authority) that is used to verify User's identity (if exists in Identity ledger), write User's identity (if do not exists in Identity ledger or append Identity attributes if provided by the User). Governmental authority may use independent tools to verify various Identity attributes. Users use their wallets 800,810 and their Identification services 820,830 to read, write or append their Identity attributes, using Identity hub 790 on Identity Blockchain Ledger 840. The data on Blockchain ledger is encrypted by Identity Hub. Identity Public Key may be received by Wallet application after Strong Identification vs. IDaaS. This is described in further detail in FIG. 13.

Figure 13:
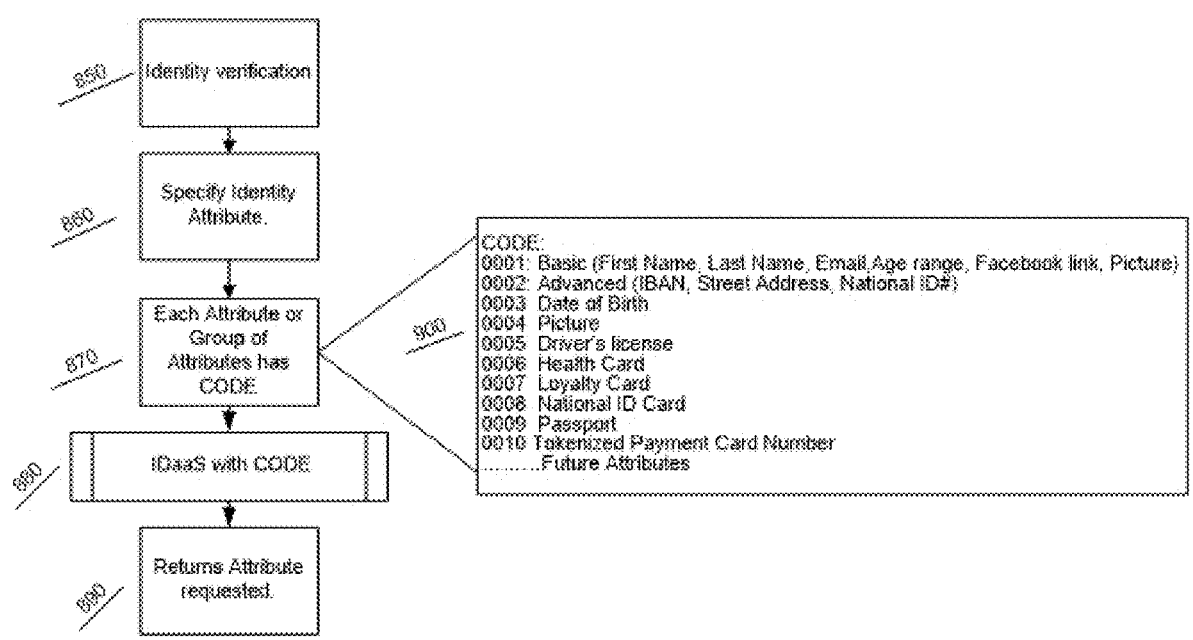
FIG. 13 Identity—Verification Flowchart.

Referring to FIG. 13—in order to perform Identity Verification 850 with user's wallet—one must specify which Identity attributes 860 he/she wants to present. This is done using CODE selection 870. Then user engages with IDaaS and enters the same CODE 880. Each CODE has specific meaning 900. The usage of CODE with IDaaS is described in greater detail in U.S. application Ser. No. 14/905,829.

Use Case #4: Internet Voting.

Figure 14:
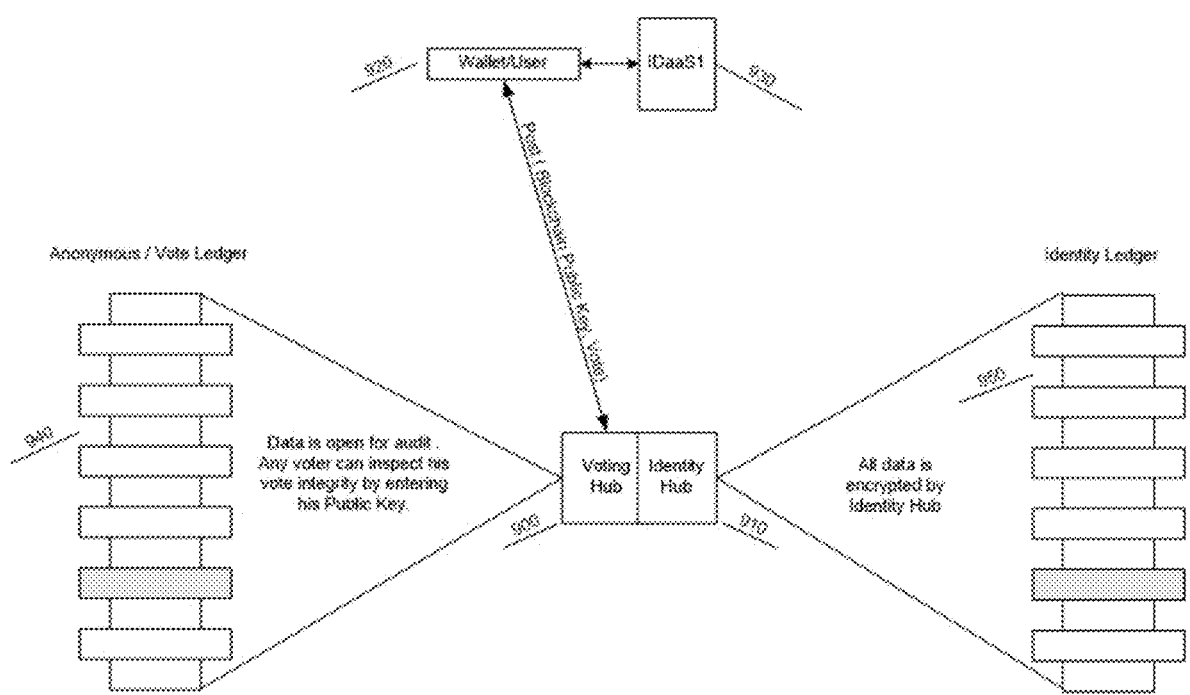
FIG. 14 Internet Voting—Architecture.

This particular embodiment is described in FIG. 14. We want to prevent from Bad Actors to influence the Vote and tinker with the Vote results. Referring to FIG. 14, were Marketplace app. is denoted by Voting Hub 900 and Identity Hub 910. User 920 Posts his vote, signed by his Private Key, and generated using IDaaS 930. Voting Hub receives his Blockchain Public Key. This Key is checked vs. Identity Ledger 950—if eligible to vote—then Vote is posted in Anonymous Vote Ledger 940. The law requires this ledger to be private and available for audit by the Voter himself.

Figure 15:
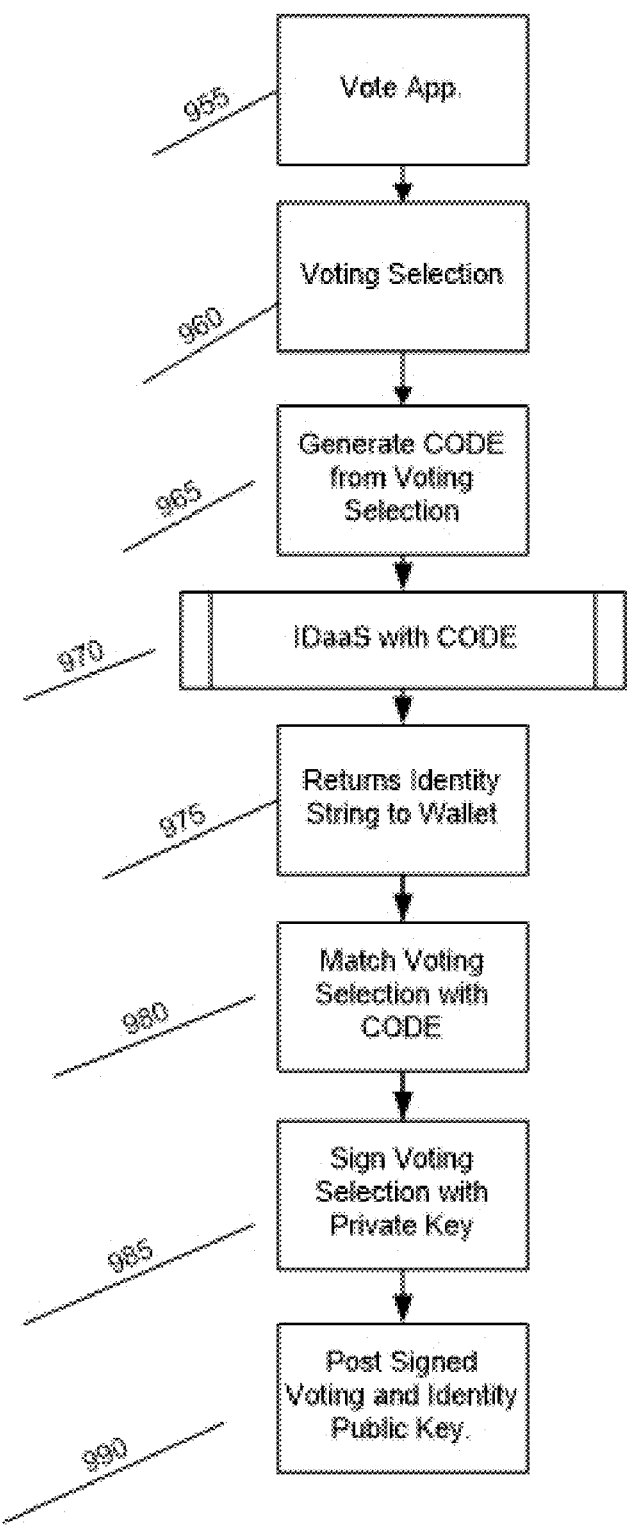
FIG. 15 Internet Voting—Using Wallet.

Referring to FIG. 15, the usage is Wallet of FIG. 14 is as following: User starts voting application 955 by voting selection 960, so that CODE is generated from voting selection 965. Identification is done using this CODE 970. Returned Identity String 975 to Wallet and Matching of Voting Selection with CODE 980 is followed by Private Key signing 985 and posting the vote 990.

Use Case #5: Identity and Access Management (IAM).

Figure 16:
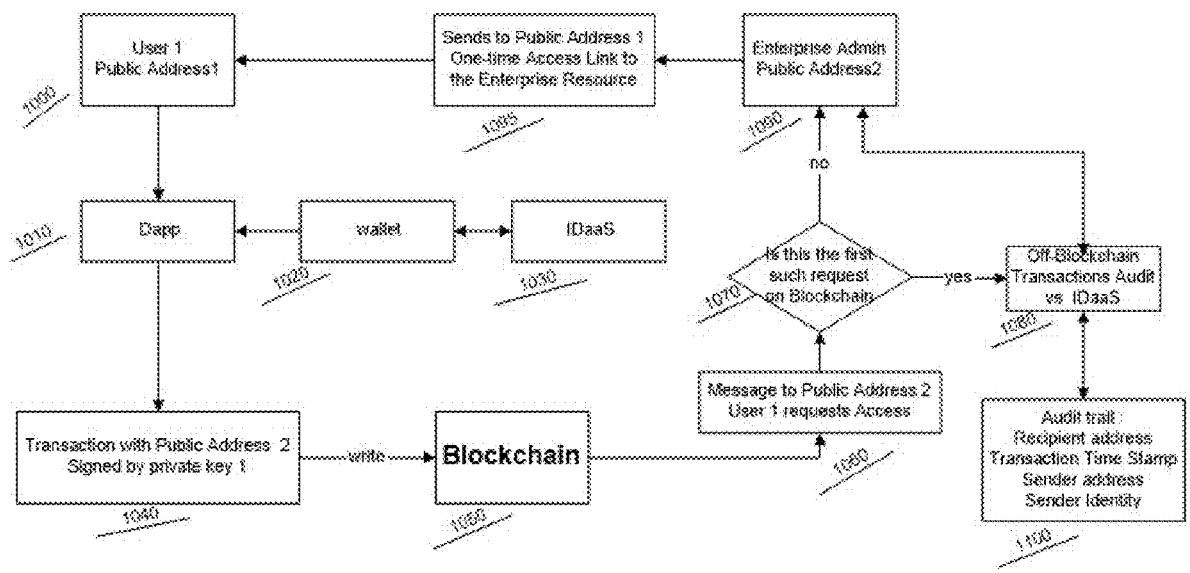
FIG. 16 Identity and Access Management—Architecture.

This particular embodiment is described in FIG. 16. Centralized systems lack the necessary flexibility to allow Extended Enterprises to serve the ever-growing IT needs of their employees, partners and customers. Referring to FIG. 16

Blockchain 1050 provides decentralized IAM for Extended Enterprise, (serving employees, partners and customers). Each IT resource in Extended Enterprise will be listed in IT Directory. Each resource in IT directory will be managed by its IT admin 1090. To get access to the resource—the user must be authorized by the IT admin.

The authorization will be recorded on Blockchain 1050. Once authorized—the user will get access to the resource, if identified successfully 1095. The access will be recorded on Blockchain 1100.

The user requesting access 1000 will open Distributed application (Dapp) 1010 using a wallet and Identification service 1030. To request access with Admin Public Address he will sign the transaction 1040 to be recorded on Blockchain 1050. The message to Admin will be sent 1060. If this is the first request 1070 then user's true Identity will be audited vs Identification service 1080. If this user has access rights (proper authorization) he will gain access 1090,1095. If this is not first a request 1070—then proper authorization is already exist and he will gain access 1090,1095.

Summarizing Use Cases 1-5, each user must have a Wallet application that is capable of aforementioned multiple functionalities. These functionalities are shown in FIG. 17. These functionalities are generally dependent on successful identification vs. IDaaS.

While the foregoing written description of the invention enables one of ordinary kill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A method for securing blockchain transactions in real-time, comprising;
    identifying a user, sending said transaction, in real-time, using personally identifiable endpoint devices, and hardware and software-based identification-as-a-service, resulting in storing said identification in database memory;
    integrating computer-based wallet, performing cryptographic functions for signing blockchain transactions and said identification, using said identification-as-a-service, wherein integration results in said identification being part of said cryptographic functions and said blockchain transactions;
    calculating, in real-time, the user's private key using said wallet and said identification-as-a-service, wherein said private key is re-created every time said wallet is opened or initialized;
    applying said user's private key to sign a transaction using an application, performing a specific activity, and linked to said wallet application;
    storing said transaction in a blockchain ledger memory, performing storage of transactions and records, and linked to said application.

2. The method of claim 1 further comprising:
    generating a wallet private key using said wallet application;
    returning an identity string to said wallet application, following said identification using said identification-as-a-service;
    calculating, in real-time, the user's private key and user's public address using said wallet private key and said identity string;
    signing the blockchain transaction using said user's private key;
    storing said transaction in said blockchain ledger memory at said user's public address;
    validating said transaction using a query between said blockchain ledger memory and said identification-as-a-service database memory.

3. The method of claim 1 wherein blockchain transactions are secured in real-time and are stored in public blockchain ledger memory.

4. The method of claim 1 wherein identification-as-a-service database memory is repeatedly storing and retrieving user's account public address paired with user's username and identity string.

5. The method of claim 1 wherein the recipient of blockchain transaction is being identified by public address, the address being verified during the identification process and subsequently being stored and retrieved in identification-as-a-service database memory.

6. The method of claim 2 wherein the wallet private key is a secret long alphanumeric number unknown to the identification-as-a-service and identity string is a secret long alphanumeric number unknown to the user.

7. The method of claim 1 wherein application is one of the group comprising information technology, financial, manufacturing, retail, insurance, government, healthcare or other verticals of the global economy.

8. The method of claim 1 wherein computer-based wallet application is one of the group comprising browser-based computer wallets, dedicated hardware wallets, PC wallets, or smartphone wallets.

9. The method of claim 1 wherein the activity is comprising centralized marketplace or decentralized peer-to-peer smart contract.

10. The method of claim 2 further comprising identity auditing of identification-as-a-service for blockchain transactions, recorded anonymously or pseudonymously in the blockchain ledger memory.

11. A system for securing blockchain transactions in real-time, comprising;
    an endpoint devices for performing a real-time identification of a user;
    an identification-as-a-service enabling said identification, further comprising of hardware and software devices, including database memory for storage of user identifications;
    a computer-based wallet performing cryptographic functionalities and integrated with said identification-as-a-service, wherein integration results in said identification being part of said cryptographic functions and said blockchain transactions;
    a calculating process, in real-time, of the user's private key using said wallet and said identification-as-a-service, wherein said private key is re-created every time said wallet is opened or initialized;

an application, performing a specific activity and linked to said wallet application;

a blockchain ledger memory, performing storage of transactions and records and linked to said application.

12. The system of claim 11, further pre-configured to:
generate a wallet private key using said wallet application;
return an identity string to said wallet application, following said identification using said identification-as-a-service
calculate, in real-time, the user's private key using said wallet private key and said identity string;
sign the blockchain transaction using said user's private key;
store said transaction in said blockchain ledger memory at said user's public address;
query link between blockchain ledger memory and, identification-as-a-service database memory.

13. The system of claim 11 wherein blockchain transactions are pre-configured to be secured by verified identities and to be stored in public blockchain ledger memory.

14. The system of claim 11 wherein the identification-as-a-service database memory is further pre-configured to repeatedly store and retrieve user's account public address paired with user's username and identity string.

15. The system of claim 11 wherein the recipient of blockchain transaction is pre-configured:
to be identified by public address;
the address being verified during the identification process and subsequently being stored and retrieved in the identification-as-a-service database memory.

16. The system of claim 12 pre-configured so that the wallet private key is a secret long alphanumeric number unknown to the identification-as-a-service and identity string is a secret long alphanumeric number unknown to the user.

17. The system of claim 11 where an application is one of the group comprising Information Technology, Financial, Manufacturing, Retail, Insurance, Government, Healthcare or other verticals of Global Economy.

18. The system of claim 11 wherein computer-based wallet application is one of the group comprising browser-based computer wallets, dedicated hardware wallets, PC wallets, or smartphone wallets.

19. The system of claim 11 wherein activity is comprising centralized marketplace or decentralized peer-to-peer smart contract.

20. The system of claim 12 further pre-configured for identity auditing the blockchain transactions, recorded anonymously or pseudonymously in the blockchain memory, using said identification-as-a-service.

* * * * *